Jan. 12, 1926.   1,569,285
L. F. KATONA
SHUT-OFF VALVE
Filed July 9, 1923
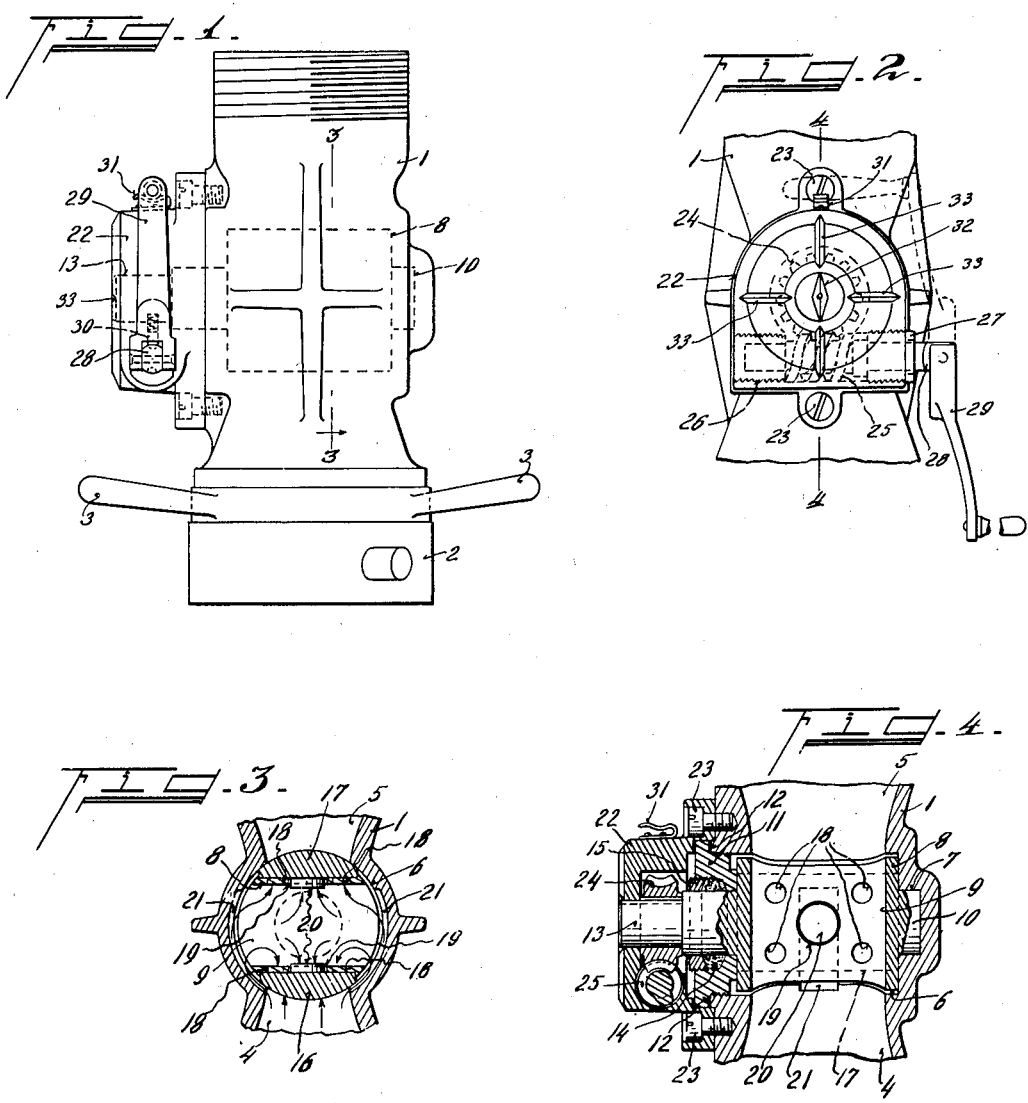
INVENTOR.
Louis F. Katona.
BY
Clarence B. Foster ATTORNEY.

Patented Jan. 12, 1926.

1,569,285

UNITED STATES PATENT OFFICE.

LOUIS F. KATONA, OF LOS ANGELES, CALIFORNIA.

SHUT-OFF VALVE.

Application filed July 9, 1923. Serial No. 650,412.

*To all whom it may concern:*

Be it known that I, LOUIS F. KATONA, a citizen of the Republic of Hungary, residing at Los Angeles, in the county of Los Angeles and State of California, have invented a new and useful Shut-Off Valve, of which the following is a specification.

This invention relates to shut-off valves and is particularly directed to valves of the general type adapted for use in high pressure fire hose lines and having gear driven valve mechanism.

In valves of this general character the gearing is usually contained within the valve chamber, which arrangement renders it necessary to dismantle the valve mechanism to gain access to the gearing. Further with such an arrangement the entire gearing including its operating shaft must be packed against leakage, this occasioning considerable difficulty from a manufacturing standpoint and serious difficulty in the matter of up-keep after the valve has become worn through use, it being nearly impossible to prevent leakage such as will greatly interfere with the convenient handling of the fire hose nozzle with which the valve is associated.

The valve mechanism of this class of valve comprises one or more loose valve plates mounted on a rotary valve carrier and in the heretofore proposed arrangements such carriers are subjected to side thrusts occasioned by the high pressure of the water on the inlet side. This produces considerable resistance to the turning of the valve mechanism and renders the valve relatively hard to operate.

It is an object of the present invention to provide a shut-off valve in which the above mentioned objectional features are eliminated; by providing a valve mechanism within the valve chamber of the body and having a shaft extending outwardly, a valve operating gearing associated with the outer end of the shaft exterior of the body, and an intermediate shaft packing providing a water tight joint separating the valve and the gear mechanisms; by supporting the gearing within a separate housing detachably secured to valve body; by providing a valve carrier of less diameter than the valve chamber thereby lessening the area of frictional contact of said carrier with the body; and by providing the body with by-pass means communicating with the valve inlet and with the interior of the carrier to create a counter-balanced pressure condition reducing side thrust on the carrier and rendering the valve mechanism easy of operation.

Various other objects and advantages will be more fully apparent from the following description of the accompanying drawings which form a part of this disclosure, and which illustrate a preferred form of embodiment of the invention.

Of the drawings:

Fig. 1 is a side elevation with the valve mechanism indicated by dotted lines.

Fig. 2 is a front elevation.

Fig. 3 is a detail section on line 3—3 of Fig. 1, and

Fig. 4 is a detail section on line 4—4 of Fig. 3.

In the drawings, 1 designates the valve body having a screw-threaded outer end for connection with any suitable type of nozzle, and having at its inner end the usual spanner wrench collar 2 for connection to the fire hose line and handles 3 for convenience in the handling of the valve nozzle.

The body has an inlet passage 4 and an outlet passage 5, and an intermediate cylindrical valve chamber 6 which is formed by a transverse bore extending inwardly from the front side of the valve body, said bore at its base having a reduced portion 7 forming an end bearing for the valve carrier.

The valve carrier 8 is of cylindrical form and is of a lesser diameter than the valve chamber 6 so as not to contact the walls of said chamber, (see particularly Fig. 3) this arrangement reducing the frictional contact of the carrier with the body to a minimum and providing a carrier which is exceedingly easy to operate. The carrier has a transverse passage 9 which registers with the inlet and outlet of the body when in open position and its lower end is provided with a journal stud 10 engaging in the end bearing 7 of the body. (See Fig. 4.)

The carrier is retained in position within the valve chamber by a bushing 11 which screws into the outer end of the valve chamber bore and has a peripheral flange engaging a gasket 12 to form a water tight joint.

A shaft 13 extends outwardly from the carrier 8 and through the bore in the bushing 11, the outer end of said bore being enlarged to provide a packing space accommodating suitable packing material 14 which is retained therein by a packing gland 15 screw-threaded in said bore. This provides a valve mechanism which is entirely enclosed within the valve body, with the shaft packing forming a water tight joint between said mechanism and the valve operating gearing to be later described.

The carrier 8 on opposite sides is longitudinally grooved and in the respective grooves are loosely positioned valve elements or plates 16—17 each extending the full length of the carrier and having a sliding contact with the valve chamber walls, and of sufficient width to close the respective inlet and outlet passages of the valve body when moved by the valve carrier to closed position. (See Fig. 3.)

Referring particularly to Figs. 3 and 4, it will be noted that each transverse wall of the carrier 8 has four apertures 18 affording communication from the passage 9 to the rear surfaces of the respective valve plates and also that said walls further have larger center apertures 19 to receive studs 20 projecting inwardly from the respective valve plates. These studs 20 are exposed to pressures within the passage 9 and are primarily intended to prevent displacement of the plates while the valve mechanism is being inserted in or removed from the valve chamber.

As clearly shown in Fig. 3, the valve body is provided with opposed bypass grooves 21 which extend from the inlet passage 4 and in opposite directions around the valve chamber to diametrically opposite points normal to the longitudinal axis of the valve body so as to communicate with the transverse passage 9 of the valve carrier when said carrier is in closed position.

The purpose of these by-pass grooves is to open the inlet passage to the passage 9 of the carrier when the valve is closed, so as to create a counter-balanced condition relieving the carrer of side thrust, thereby rendering the valve mechanism exceedingly easy of operation and reducing the wear thereof to a minimum. Further, when the valve is opened the by-pass grooves permit the water pressure to be exerted against the outer surfaces of the valve plates so that said plates do not in such instance have a forceful bearing against the valve chamber walls.

This arrangement provides a valve mechanism including a rotary valve carrier free from contact with the side walls of the valve chamber and carrying opposed valve elements or plates, with by-pass means creating a counter-balancing of pressure whereby when the valve is opened both plates are held from forceful engagement with the chamber walls and when the valve is closed only one of said plates functioning to close the fluid passage through the valve by forcefully engaging said walls.

The valve operating mechanism is associated with the outer end of the shaft 13 and is enclosed within a housing 22 detachably secured to the exterior of the valve body 1, by suitable screws 23. Said mechanism includes a worm wheel 24 loosely keyed to the outer end of the shaft 13 so it may readily slip off said shaft with the removal of the housing and a worm pinion 25 meshing with said worm wheel and positioned in a transverse bore in the housing with its shaft 28 journaled in bushings 26—27 screwed into said bore. The worm pinion shaft 28 extends through the bushing 27 and carries a pivoted operating handle 29 which is adapted to be swung to operating position shown in full lines in Fig. 2, or to an inoperative postion shown in dotted lines in Fig. 2 and in full lines in Fig. 1. Said handle is provided with a spring operated plunger 30 which engages with suitable indents in the shaft 28 to maintain the handle in either position and a spring retaining clip 31 is provided to maintain the handle from falling forward from its inoperative position.

The outer end of the valve shaft 13 extends through the front housing wall and has an indicating mark 32 formed thereon and said front housing wall carries indication marks 33, such marks serving as indicating means by which the position of the valve mechanism is indicated.

This valve and operating mechanism may be rotated without limit in either direction and provides a positive control which is effectively guarded against leakage and excessive wear, and which can be operated with minimum effort.

While the preferred form of embodiment herein illustrated and described is admirably adapted to fulfill all of the objects primarily stated it is to be understood that I do not wish to limit the invention in this regard, for it is susceptible of embodiment in various other forms, all coming within the scope of the following claims.

I claim:

1. A shut-off valve of the nature disclosed comprising a body provided with means for attachment to a hose or pipe line having an inlet and an outlet axially aligned and a transverse intermediate valve chamber closed at one end having a valve receiving opening at its opposite end, a freely rotatable valve insertable through said opening, a closure for said opening, the valve having an operating shaft extending through said closure, valve operating gear mechanism associated with the outer end of said shaft, a housing entirely enclosing said gear mechanism and said closure, and a shaft packing carried by the closure and preventing leakage from the valve chamber into said housing, the housing being detachably secured in place on the body to permit its removal independent of the closure and the subsequent removal of the closure whereupon the valve may be withdrawn through the valve chamber opening.

2. A shut-off valve of the nature disclosed comprising a body provided with means for attachment to a hose or pipe line having an inlet and an outlet and a transverse intermediate valve chamber having a valve receiving opening, a closure for said valve chamber, a freely rotatable valve insertable through said opening and having an operating shaft extending through the closure, gear mechanism associated with the shaft, a housing entirely enclosing said gear mechanism and detachably secured in place and adapted for removal to permit a subsequent removal of the closure, means associated with the closure preventing leakage from the valve chamber into the housing, said gear mechanism comprising a worm gear detachably keyed to the shaft and a worm pinion meshing with said worm gear and journaled in and removable with the housing and having an operating shaft extending outwardly from said housing, and an operating handle secured to said pinion shaft.

3. A shut-off valve of the nature disclosed comprising a body provided with means for attachment to a hose or pipe line having an inlet and an outlet and a transverse intermediate valve chamber, a freely rotatable valve in said chamber and having an operating shaft extending outwardly therefrom, valve operating gear mechanism associated with said shaft, a housing enclosing said gear mechanism, leak preventing means between the valve chamber and the housing, a second shaft connected with the gear mechanism and extended outwardly from the housing, an operating handle hinged to said second shaft and foldable to an inoperative position, and means engaging the outer free end of said handle when in inoperative position to retain it against accidental displacement.

4. A shut-off valve of the nature disclosed comprising a body provided with means for attachment to a hose or pipe line having an inlet and an outlet axially aligned and an intermediate valve chamber, a closure for said valve chamber, a valve within said chamber having an operating shaft extending through the closure, a gear mechanism associated with said shaft, a housing detachably secured to the body and entirely enclosing said gear mechanism and said closure, said gear mechanism including a worm gear wheel keyed to said shaft and adapted to slide axially off the outer end thereof, a worm gear pinion meshing with said wheel and entirely supported by the housing and having a pinion shaft extending through the wall of the housing to the exterior, and an operating handle on the outer end of the pinion shaft, the parts being arranged whereby with a removal of the housing the pinion, pinion shaft and handle are bodily removed therewith and the gear wheel is slid off and free from the valve operating shaft, without removal of the closure and valve.

5. A shut-off valve of the nature disclosed including a body provided with means for attachment to a hose or pipe line having an inlet and an outlet and an intermediate transverse cylindrical valve chamber, a cylindrical valve carrier rotatable in said chamber and having a transverse fluid passage, opposite duplicate valve elements carried by the carrier and disposed on an axis transverse to the axis of said fluid passage, each valve element engaging the inner peripheral wall of the valve chamber and either of said valve plates adapted to close the outlet of the valve body when brought into registry therewith, the walls of the carrier having apertures exposing the inner surfaces of the valve elements to pressure within the transverse fluid passage of the carrier, and the body having permanently unrestricted by-pass means establishing communication between the body inlet and said carrier transverse fluid passage when said carrier is in closed position.

6. A shut-off valve of the nature disclosed including a body provided with means for attachment to a hose or pipe line having an inlet and an outlet and an intermediate transverse cylindrical valve chamber, a cylindrical valve carrier rotatable in said chamber and free from contact with the side walls thereof, oppositely disposed duplicate valve plates each carried by said carrier and engaging the walls of the valve chamber and either of said valve plates adapted to close the outlet of the body when brought into registry therewith, the carrier having a transverse fluid passage between said plates and apertures in the wall of said fluid passage exposing the inner surfaces of said plates to pressure within said transverse fluid passage, and the body having permanently unrestricted by-pass means effecting an equalized pressure condition relieving the valve carrier of side thrusts.

Signed at Los Angeles, California, this 29th day of June, 1923.

LOUIS F. KATONA.